No. 754,820. PATENTED MAR. 15, 1904.
C. D. SHORTS.
STUFFING BOX.
APPLICATION FILED JUNE 17, 1903.
NO MODEL.
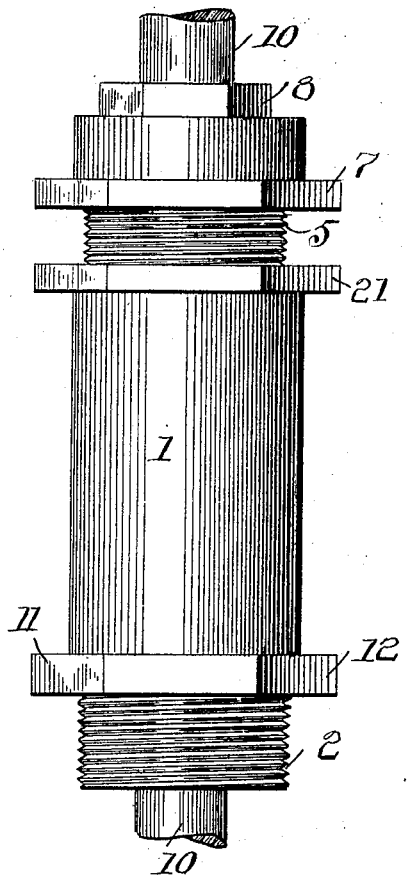
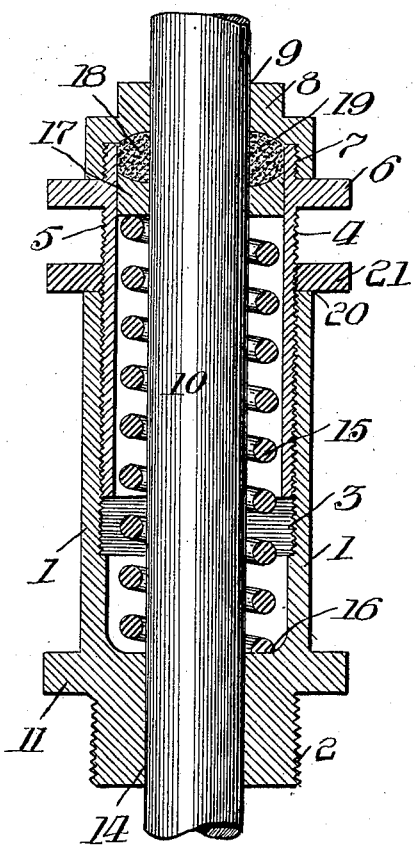
Witnesses:
Geo. B. Rowley.
H. H. Butler.
Inventor
C. D. Shorts,
By
N. C. Evert & Co.
Attorneys.

No. 754,820. Patented March 15, 1904.

UNITED STATES PATENT OFFICE.

CLAIR D. SHORTS, OF FERN, PENNSYLVANIA.

STUFFING-BOX.

SPECIFICATION forming part of Letters Patent No. 754,820, dated March 15, 1904.

Application filed June 17, 1903. Serial No. 161,812. (No model.)

*To all whom it may concern:*

Be it known that I, CLAIR D. SHORTS, a citizen of the United States of America, residing at Fern, in the county of Clarion and State of Pennsylvania, have invented certain new and useful Improvements in Stuffing-Boxes, of which the following is a specification, reference being had therein to the accompanying drawings.

This invention relates to certain new and useful improvements in stuffing-boxes and the like, and has for its object the provision of novel means whereby as the stuffing carried within the box becomes worn the same will be depressed and held snugly in contact with the shaft passing through the stuffing-box.

Another object of my invention is to provide a stuffing-box containing means whereby the stuffing as the same wears may be forced into a more compact position, whereby the same will be in continual engagement with the periphery of the shaft which passes through the stuffing-box, means being carried by said stuffing-box to regulate the tension upon the stuffing carried within the box.

Briefly described, my improved stuffing-box comprises a casing which is adapted to carry the casing proper in which is located the stuffing, and in said stuffing-box adjacent to the stuffing is secured a follower, a coil-spring being employed to continually force the follower against the stuffing, whereby the same will be depressed and forced into engagement with the shaft passing through the box. Means is provided upon the exterior of the stuffing-box to regulate the tension of the spring carried therein.

In describing the invention in detail reference is had to the accompanying drawings, forming a part of this specification, and wherein like numerals of reference indicate like parts throughout both views, in which—

Figure 1 is a side elevation of my improved stuffing-box, and Fig. 2 is a vertical sectional view of the same.

To put my invention into practice, I provide a cylindrical casing 1, which has its lower end screw-threaded, as indicated at 2, whereby said casing may be secured to any apparatus or machine wherein a stuffing-box is employed. The interior of this cylindrical casing 1 is screw-threaded, as indicated at 3, to receive the auxiliary casing 4, which is cylindrical in form and has its exterior periphery screw-threaded, as indicated at 5. This cylindrical casing carries the extensions 6, forming the nuts 7, whereby the same may be regulated within the casing 1. The upper end of this casing 4 is also screw-threaded, as indicated at 7, to receive a tap or nut 8, having an aperture 9 formed therein, through which passes the shaft or axle 10 of the apparatus or machine to which the stuffing-box is attached. The lower end of the cylindrical casing 1 carries the extensions 11, forming the nut 12, and this end of the casing has a central aperture formed therein, as indicated at 14, through which passes the shaft heretofore mentioned. In the cylindrical casing 4 and in the casing 1 I mount a spiral spring 15, the lower end of which rests upon the shoulder 16 of the cylindrical casing 1, the upper end of which is adapted to rest against and support a cylindrical follower 17, which has a central aperture 18 formed therein, through which passes the shaft or axle 10. Between the upper edge of this follower 17 and the nut or tap 8 is placed the stuffing 19, which is of the ordinary material or ingredients now generally used.

Between the upper edge 20 of the cylindrical casing 1 and the nut 7 of the cylindrical casing 4 I secure a nut 21, which is adapted to be screw-threaded upon the threads 5 of the cylindrical casing 4, whereby the cylindrical casing 4 may be locked in any desired position within the cylindrical casing 1. By means of the screw-threads 5, carried by the cylindrical casing 4, the expanding and contracting of the spiral spring 15 may be regulated whereby the depression of the collar or follower 17 upon the stuffing 19 may be regulated.

While I have herein shown and described the above construction as that preferred by me, it is obvious that various changes may be made in the details of construction without departing from the general spirit of my invention.

Having fully described my invention, what I claim as new, and desire to secure by Letters Patent, is—

1. A stuffing-box comprising a cylindrical casing, an auxiliary casing adjustably mounted within the same, a follower mounted within the auxiliary casing, stuffing material mounted thereon, means for normally holding the follower in engagement with the stuffing material whereby the same is compressed, comprising a spring member carried by said casings, and means carried by the auxiliary casing for adjusting said spring, substantially as described.

2. A stuffing-box in combination with a shaft or axle which is adapted to pass through said stuffing-box, of a cylindrical casing, an auxiliary casing adjustably secured therein, stuffing material carried within said auxiliary casing, a follower mounted within said casing, means carried within said casings to normally hold the follower in engagement with the stuffing whereby the same will be compressed and normally held in engagement with the periphery of the shaft adapted to pass therethrough, means carried by said auxiliary casing to regulate the tension of the means for holding the follower in contact with the stuffing, substantially as described.

3. A stuffing-box comprising a cylindrical casing interiorly threaded, an auxiliary casing adjustably mounted within and engaging the threaded portion of the first-named casing, stuffing mounted within the auxiliary casing, a follower adapted to engage the stuffing, and adjustable means adapted to engage the follower to force the same into engagement with the stuffing, and means carried by the auxiliary casing for adjusting the last-named means, substantially as described.

4. A stuffing-box comprising a cylindrical casing, an auxiliary casing adapted to be secured within the first-named casing, means carried by said auxiliary casing whereby the same may be adjusted within first-named casing, stuffing material secured in the auxiliary casing, a follower mounted within said casing, a spring carried by said casings for normally holding said follower in engagement with the stuffing whereby the same will be compressed, means carried by the auxiliary casing for adjusting said spring, substantially as described.

In testimony whereof I affix my signature in the presence of two witnesses.

CLAIR D. SHORTS.

Witnesses:
C. C. KRIBBS,
D. W. LEWIS.